United States Patent
Chen et al.

(10) Patent No.: US 6,844,120 B2
(45) Date of Patent: Jan. 18, 2005

(54) MICRO-FLUIDIC MANUFACTURING METHOD FOR FORMING A COLOR FILTER

(75) Inventors: Chin-Tai Chen, Kaohsiung (TW); Chun-Fu Lu, Hsinchu (TW); Fanny Shieh, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/196,201

(22) Filed: Jul. 17, 2002

(65) Prior Publication Data

US 2003/0118921 A1 Jun. 26, 2003

(30) Foreign Application Priority Data

Dec. 25, 2001 (TW) ............................ 90132242 A

(51) Int. Cl.⁷ ................................................ G03F 9/00
(52) U.S. Cl. ........................... 430/7; 347/106; 347/107
(58) Field of Search ................. 430/7; 347/106, 347/107

(56) References Cited

U.S. PATENT DOCUMENTS 6,468,702 B1 * 10/2002 Yi et al. .......................... 430/7

2003/0108804 A1 * 6/2003 Cheng et al. .................. 430/7

FOREIGN PATENT DOCUMENTS

| JP | 5-241012 A | * | 9/1993 |
| JP | 2001-183516 A | * | 7/2001 |

* cited by examiner

Primary Examiner—John A. McPherson
(74) Attorney, Agent, or Firm—Birch, Stewart, Kolasch & Birch, LLP

(57) ABSTRACT

A micro-fluidic manufacturing method of forming a color filter. First, a transparent substrate is provided with a plurality of black matrixes. Then, a plurality of ribs are formed on the black matrixes respectively, wherein the width of the rib is not larger than the width of the black matrix. Next, a plurality of micro fluids is injected within a plurality of predetermined areas separated by the ribs, wherein the micro fluids within each predetermined area are mixed to serve as an ink. Next, each ink within each predetermined area is dried to form a plurality of color layers of different colors. Finally, after removing the ribs, a transparent conductive layer is formed on the transparent substrate to cover the black matrixes and the color layers.

17 Claims, 11 Drawing Sheets

MICRO-FLUIDIC MANUFACTURING METHOD FOR FORMING A COLOR FILTER

BACKGROUND OF THE INVENTION

1. Field of the Invention

The present invention relates to a micro-fluidic manufacturing method for forming a color filter and, more particularly, to a micro-fluidic manufacturing method which injects micro fluids into a predetermined area separated by high-wall ribs to prevent color mixing.

2. Description of the Related Art

U.S. Pat. No. 5,251,071 and U.S. Pat. No. 5,697,391 disclose a pigment-dispersed method of forming a color filter. First, using spin coating, one of three color resists of R (red), G (green), B (blue) is coated on a transparent substrate. Then, using lithography, the color resist is patterned on a predetermined area of the transparent substrate. Thereafter, repeating the above-described steps, the other two color resists are sequentially patterned on the transparent substrate.

However, in spin coating the color resist on the transparent substrate, since centrifugal force is generated, the color resist becomes thinner in the spin center and thicker on the edge. Also, when the transparent substrate of a larger size is used, the non-uniformity of thickness in the color resist becomes more serious. Furthermore, the non-uniformity causes resist residue during the subsequent lithography. Moreover, since three lithography processes with photo masks are required, the non-uniformity causes incorrect alignment among the photo masks. U.S. Pat. No. 5,716,740 and U.S. Pat. No. 5,593,757 disclose an injecting method of forming a color filter, in which an injecting head is employed to simultaneously inject the three R, G, and B pigments on a transparent substrate. However, during injecting, the three pigments flow on the transparent substrate, resulting in color mixing. In another case, when an inject receiver is installed in the transparent substrate, the three pigments easily spread and permeate into the inject receiver, resulting in a variation in color on the color filter.

Thus, a method of forming a color filter solving the aforementioned problems is called for.

SUMMARY OF THE INVENTION

The present invention provides a micro-fluidic manufacturing method of forming a color filter. First, a transparent substrate is provided with a plurality of black matrixes. Then, a plurality of ribs are formed on the black matrixes respectively, wherein the width of the rib is not larger than the width of the black matrix. Next, a plurality of micro fluids is injected within a plurality of predetermined areas separated by the ribs, wherein the micro fluids within each predetermined area are mixed to serve as an ink. Next, each ink within each predetermined area is dried to form a plurality of color layers of different colors. Finally, after removing the ribs, a transparent conductive layer is formed on the transparent substrate to cover the black matrixes and the color layers.

Accordingly, it is a principal object of the invention to provide a micro-fluidic method of forming a color filter to prevent color mixing.

It is another object of the invention to provide a micro-fluidic method of forming a color filter to prevent ink overflow.

Yet another object of the invention is to provide a micro-fluidic method of forming a color filter to ensure the manufacturing property.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

[First Embodiment]

Figure 1A:
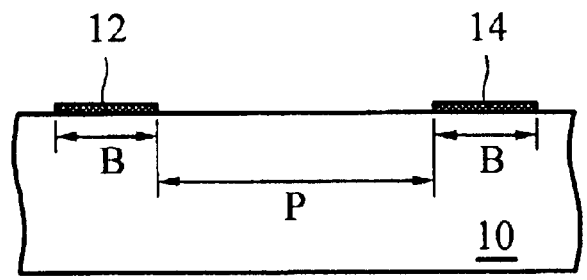
FIGS. 1A to 1K are sectional diagrams showing a method of forming a color filter according to the first embodiment of the present invention.

FIGS. 1A to 1K are sectional diagrams showing a method of forming a color filter according to the first embodiment of the present invention. First, as shown in FIG. 1A, a transparent substrate 10 is provided with two black matrixes 12 and 14, in which the width of each black matrix 12, 14 is B, and the distance between the black matrixes 12 and 14 is P. The two black matrixes 12 and 14 are used to define the size of a pixel area of a liquid crystal display.

Figure 1B:
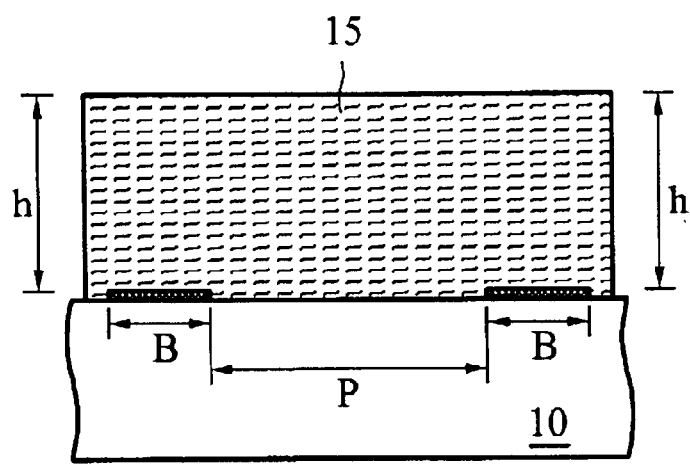

Then, as shown in FIG. 1B, using dry film lamination or wet spin coating, a photoresist layer 15 of h thickness is formed on the transparent substrate 10.

Figure 1C:
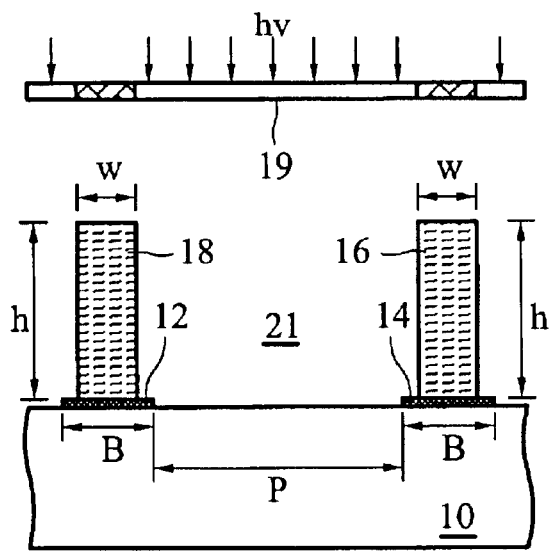

Next, as shown in FIG. 1C, using exposure and development with a first photo mask 19, the photoresist layer 15 is patterned to become a plurality of high-wall ribs 16 and 18 over the black matrixes 12 and 14, respectively, thus a deep trench 21 is formed between the two high-wall ribs 16 and 18. Preferably, the width W of each high-wall rib 16, 18 is not larger than the width B of each black matrix 12, 14. The high-wall ribs 16 and 18 are temporarily formed over the black matrixes 12 and 14 to prevent color mixing from three different pigments.

Figure 1D:
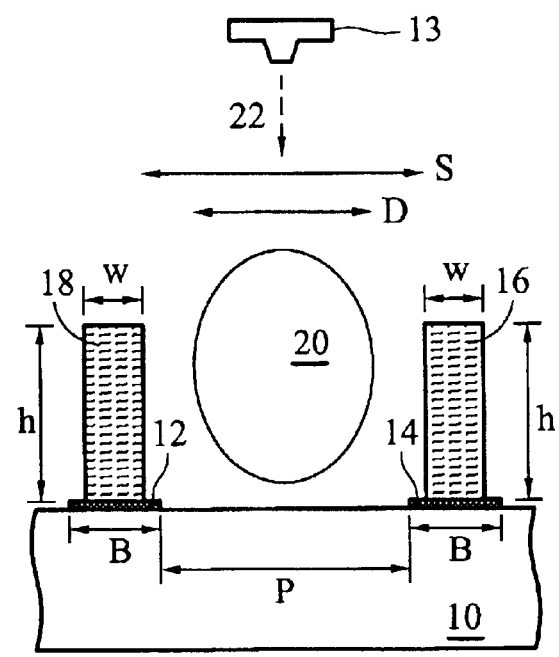

Next, as shown in FIG. 1D, using a micro-fluidic jetting device 13, such as a thermal bubble ink jet printing apparatus or a piezoelectric ink jet printing apparatus, a micro fluid 20 of predetermined color ink is injected in to the deep trench 21 between the two high-wall ribs 16 and 18. In order to prevent color mixing from the ink overflowing outside the high-wall ribs 16 and 18, the largest diameter D of the micro fluid 20 is preferably less than the distance S between the two high-wall ribs 16 and 18.

Figure 1E:
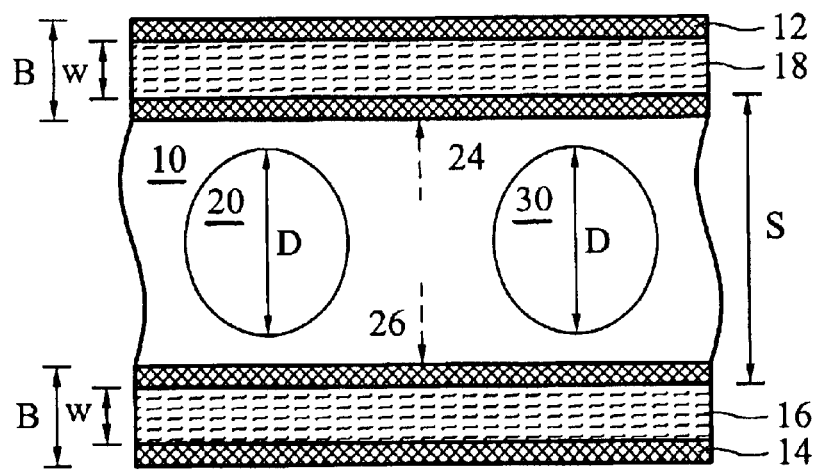
Figure 1F:
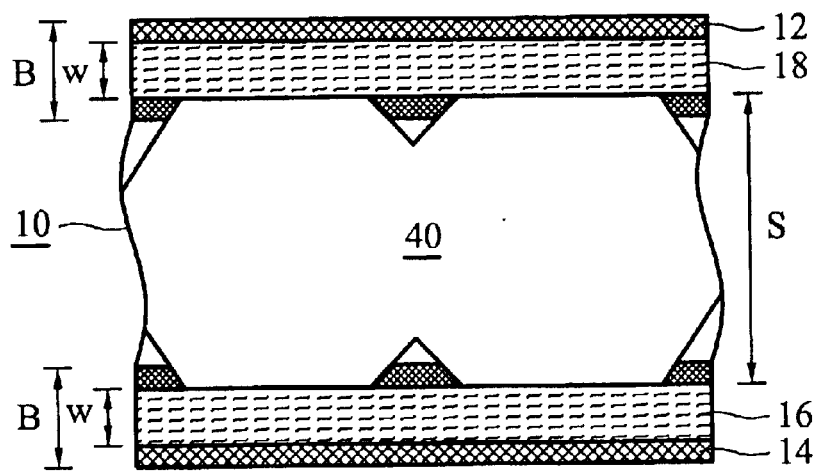
Figure 1G:
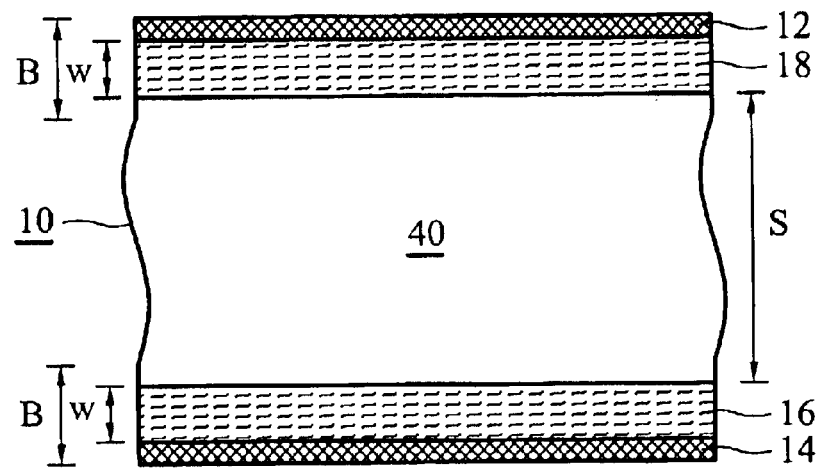

Thereafter, as shown in FIGS. 1E to 1G, after the micro fluid 20 or 30 contact the transparent substrate 10, the micro fluid 20 or 30 flows on the transparent substrate 10 according to its surface tension as shown by dotted lines 24 and 26. Then, the micro fluids 20 or 30 are mixed and uniformly distributed between the high-wall ribs 16 and 18 to serve as an ink 40.

Figure 1H:
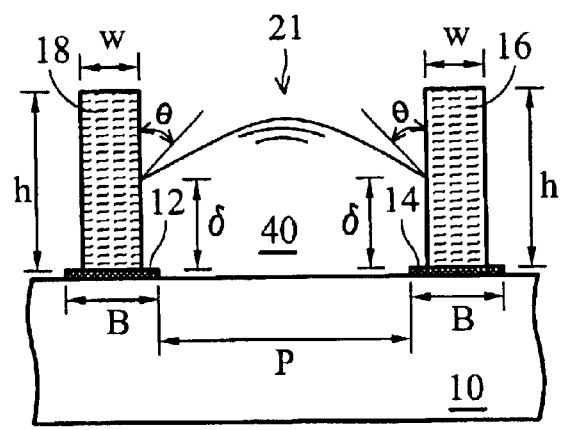
Figure 1I:
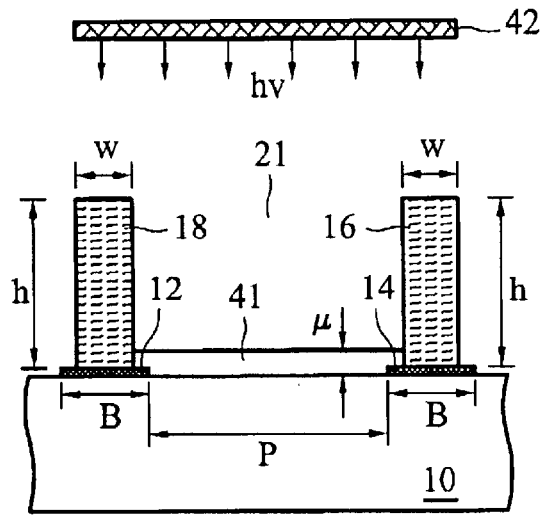

Next, as shown in FIGS. 1H and 1I, in the deep trench 21, the depth δ of the ink 40 is less than the height h of each high-wall rib 16 or 18. Also, the contact angle θ is less than 90° because the hydrophobic property is not found between the high-wall rib 16, 18 and the ink 40. In addition, a solidifying device, such as a heating device or a luminescent device, is employed to dry the ink 40 as a color layer 41 with a planar surface. Preferably, the thickness μ of the color layer is 0.2 $\mu m$~1.2 $\mu m$(1 $\mu m=10^{-6}$ m)

Figure 1J:
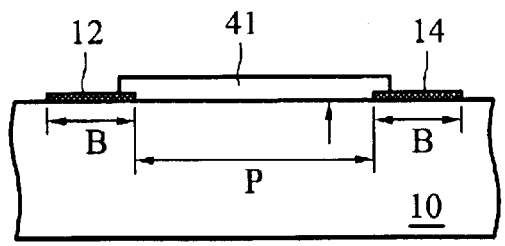

Then, as shown in FIG. 1J, using stripper, such as acetone, the high-wall ribs 16 and 18 are removed. The high-wall ribs 16 and 18 must be completely removed to prevent the color of the color layer 41 being changed from the residual ribs 16 and 18. After removing the ribs 16 and 18, the color variation $\Delta E_{ab}$ is less than 5.

Figure 1K:
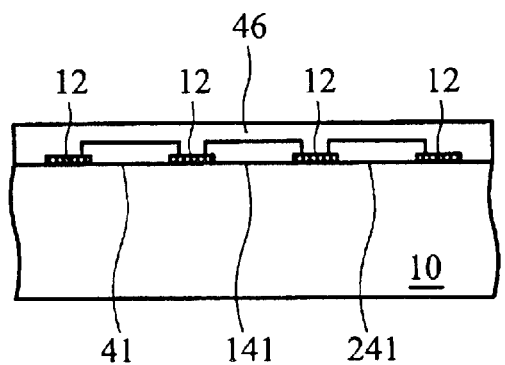

Next, as shown in FIG. 1K, after forming a red color layer 41, a green color layer 141, and a blue color layer 241 between black matrixes 12, a transparent conductive layer 46 is formed to cover the color layers 41, 141 and 241 and the black matrixes 12. Preferably, the transparent conductive layer 46 is an ITO film by vacuum sputtering.

[Second Embodiment]

Figure 2A:
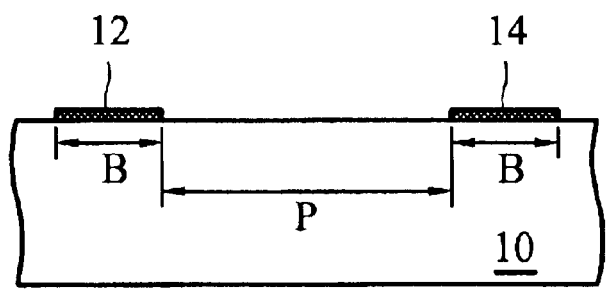
FIGS. 2A to 2K are sectional diagrams showing a method of forming a color filter according to the second embodiment of the present invention.
Figure 2B:
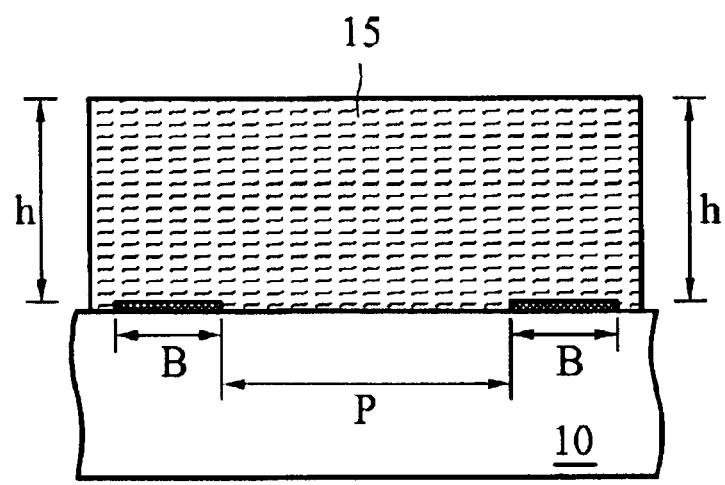

FIGS. 2A to 2K are sectional diagrams showing a method of forming a color filter according to the second embodiment of the present invention. First, as shown in FIG. 2A, a transparent substrate 10 is provided with two black matrixes 12 and 14, in which the width of each black matrix 12, 14 is B, and the distance between the black matrixes 12 and 14 is P. The two black matrixes 12 and 14 are used to define the size of a pixel area of a liquid crystal display. Then, as shown in FIG. 2B, using dry film lamination or wet spin coating, a photoresist layer 15 of h thickness is formed on the transparent substrate 10.

Figure 2C:
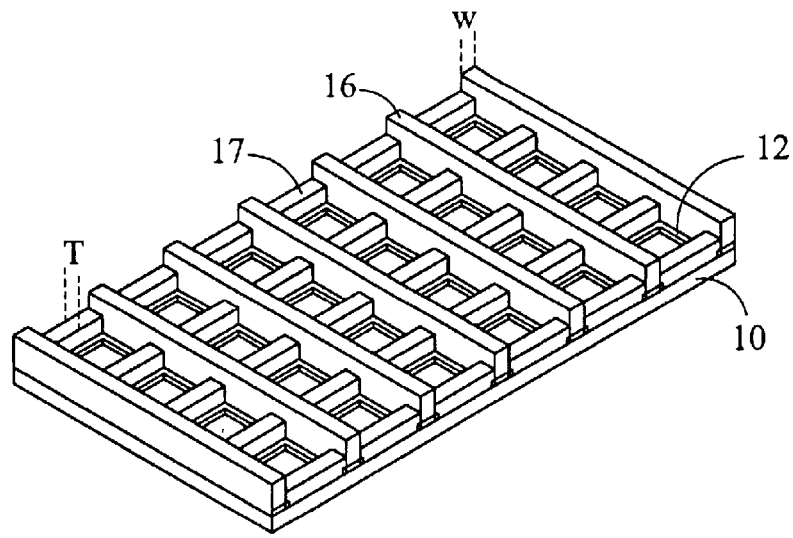

Next, as shown in FIG. 2C, using exposure and development with a second photo mask (not shown), the photoresist layer 15 is patterned to become a plurality of high-wall ribs 16 over the black matrixes 12, 14 respectively, and a plurality of connecting ribs 17. Thus, a deep trench 21 is formed between the two high-wall ribs 16. Preferably, the width W of each high-wall rib 16 is not larger than the width B of each black matrix 12, 14. The connecting rib 17 is employed to connect two strips of the high-wall ribs 16 to prevent the high-wall rib 16 from collapse. The width T of the connecting rib 17 is not larger than the width B of the black matrix 12. The high-wall ribs 16 and connecting ribs 17 are temporarily formed over the black matrixes 12 and 14 to prevent color mixing from three different pigments.

Figure 2D:
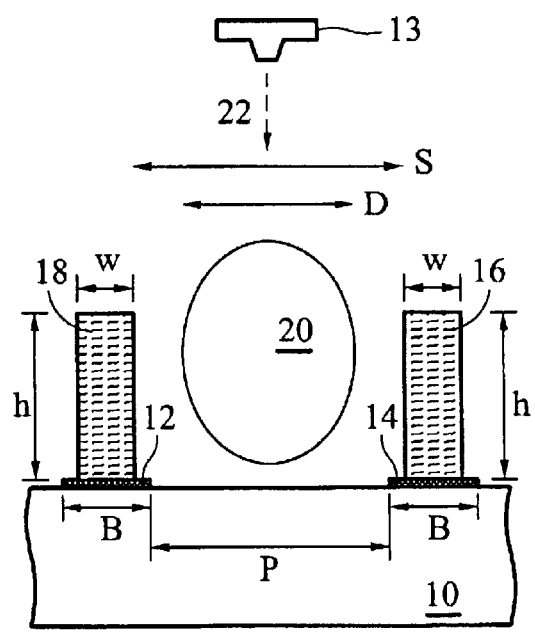

Next, as shown in FIG. 2D, using a micro-fluidic jetting device 13, such as thermal bubble ink jet printing apparatus or a piezoelectric ink jet printing apparatus, a micro fluid 20 of predetermined color ink is injected into the deep trench 21 between the two high-wall ribs 16 and 18. In order to prevent color mixing from the ink overflowing outside the high-wall ribs 16 and 18, the largest diameter D of the micro fluid 20 is preferably less than the distance S between the two high-wall ribs 16 and 18.

Figure 2E:
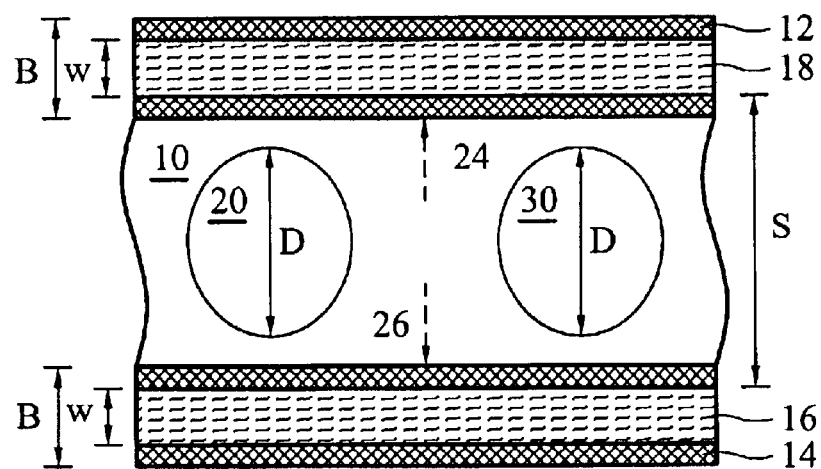
Figure 2F:
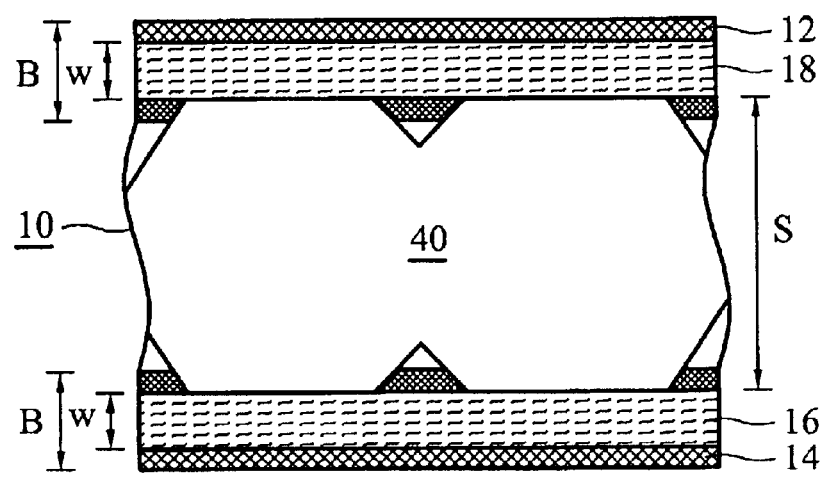
Figure 2G:
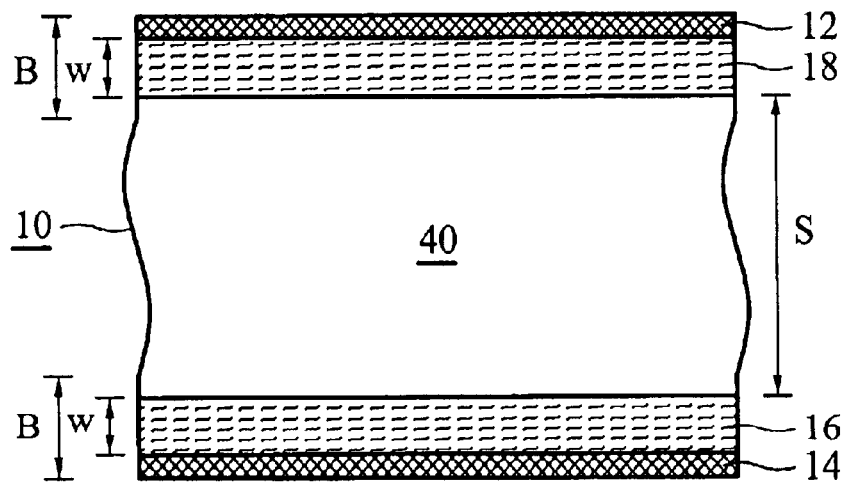

Thereafter, as shown in FIGS. 2E to 2G, after the micro fluid 20 or 30 contact the transparent substrate 10, the micro fluid 20 or 30 flows on the transparent substrate 10 according to its surface tension as shown by dotted lines 24 and 26. Then, the micro fluids 20 or 30 are mixed and uniformly distributed between the high-wall ribs 16 and 18 to serve as an ink 40.

Figure 2H:
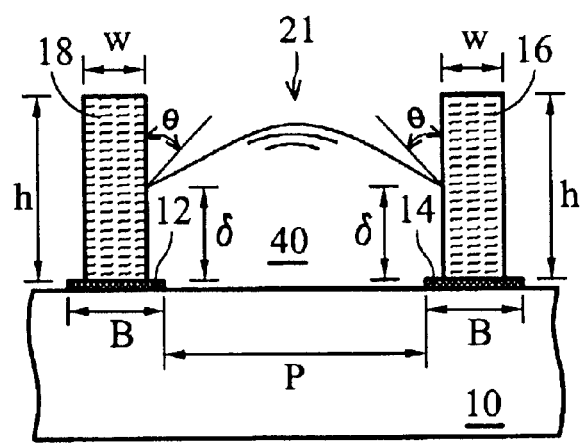
Figure 2I:
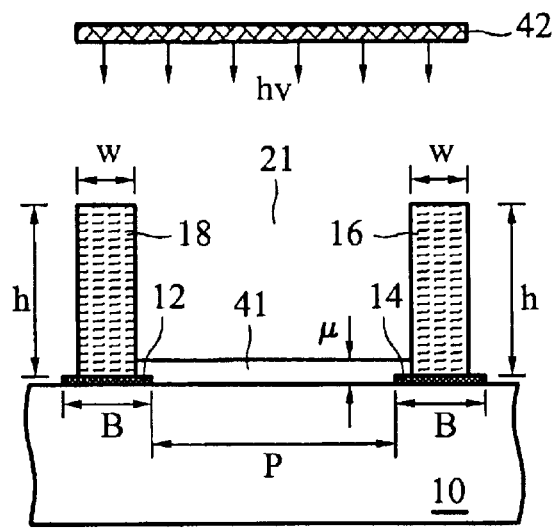

Next, as shown in FIGS. 2H and 2I, in the deep trench 21, the depth δ of the ink 40 is less than the height h of each high-wall rib 16 or 18. Also, the contact angle θ is less than 90° because the hydrophobic property is not found between the high-wall rib 16, 18 and the ink 40. In addition, a solidifying device, such as a heating device or a luminescent device, is employed to dry the ink 40 as a color layer 41 with a planar surface. Preferably, the thickness μ of the color layer is 0.2 μm~1.2 μm (1 μm=$10^{-6}$ m)

Figure 2J:
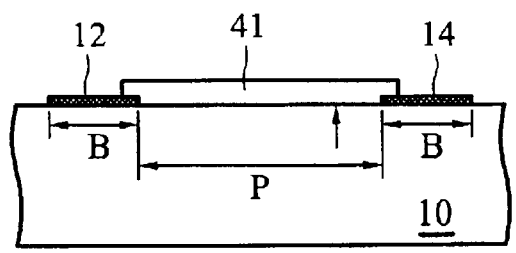

Then, as shown in FIG. 2J, using stripper, such as acetone, the high-wall ribs 16, 18 and connecting ribs 17 are removed. The high-wall ribs 16, 18 and connecting ribs 17 must be completely removed to prevent the color of the color layer 41 being changed from the residual ribs 16 and 18. After removing the ribs 16 and 18, the color variation $\Delta E_{ab}$ is less than 5.

Figure 2K:
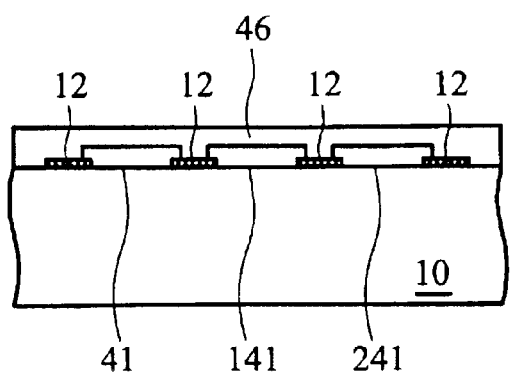

Next, as shown in FIG. 2K, after forming a red color layer 41, a green color layer 141, and a blue color layer 241 between black matrixes 12, a transparent conductive layer 46 is formed to cover the color layers 41, 141 and 241 and the black matrixes 12. Preferably, the transparent conductive layer 46 is an ITO film by vacuum sputtering.

Figure 3:
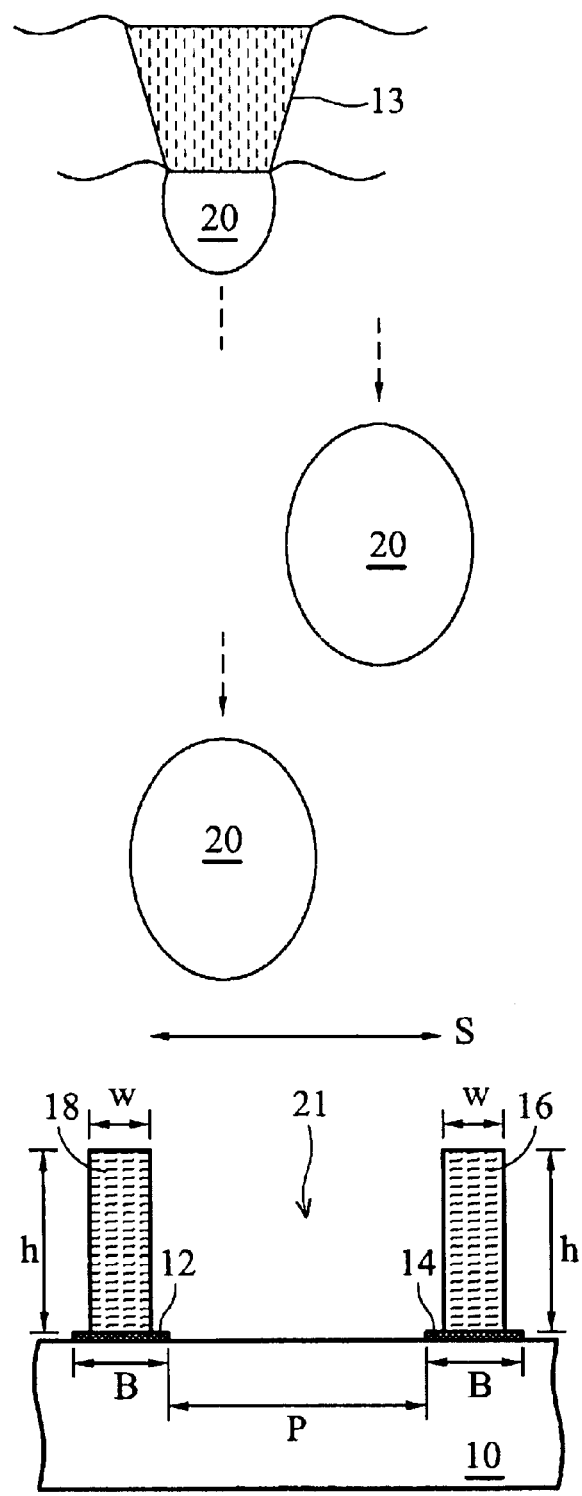
FIG. 3 is a schematic diagram showing the micro-fluidic jetting device of the present invention.

FIG. 3 is a schematic diagram showing the micro-fluidic jetting device 13 with a larger position tolerance for injecting micro fluid. Since the largest diameter D of the micro fluid 20 is less than the distance S between the two high-wall ribs 16 and 18, a larger position tolerance is provided between the two high-wall ribs 16 and 18 to ensure that the micro fluid 20 is injected into the deep trench 21.

The black matrix 12 may be chromium (Cr) or resin. The ink 40 has a surface tension between 20~60 dyne/cm. The height h of the high-wall rib 16 is larger than a half of the diameter D of the micro fluid 20 and less than the diameter D of the micro fluid 20 for preventing color mixing from the micro fluid 20 overflowing.

It is to be understood that the present invention is not limited to the embodiments described above, but encompasses any and all embodiments within the scope of the following claims.

What is claimed is:

1. A micro-fluidic manufacturing method of forming a color filter, comprising steps of:

providing a transparent substrate with a plurality of black matrixes;

forming a photoresist layer on the transparent substrate to cover the black matrix; and using lithography to pattern the photoresist layer as a plurality of strips of high-wall ribs and forming a plurality of ribs on the black matrixes respectively, wherein the width of the rib is not larger than the width of the black matrix, and wherein during lithography, the photoresist layer is patterned as a plurality of connecting ribs for connecting the strips of high-wall ribs, in which the height of the connecting rib is less than the height of the high-wall rib, and the width of the connecting rib is not larger than the width of the black matrix;

injecting a plurality of micro fluids into a plurality of predetermined areas separated by the ribs, wherein the micro fluids within each predetermined area are driven and mixed by surface tension of fluids to serve as an ink;

drying each ink within each predetermined area to form a plurality of color layers of different colors;

removing the high-wall ribs and connecting ribs; and forming a transparent conductive layer on the transparent substrate to cover the black matrixes and the color layers.

2. The method according to claim 1, wherein during injection of micro fluids, a micro-fluidic jetting device is employed.

3. The method according to claim 2, wherein the micro-fluidic jetting device is a thermal bubble ink jet printing apparatus or a piezoelectric ink jet printing apparatus.

4. The method according to claim 1, wherein during drying of the ink, a heating device is employed.

5. The method according to claim 4, wherein the heating device is a luminescent device.

6. The method according to claim 1, wherein the photoresist layer is formed on the transparent substrate by a dry film method.

7. The method according to claim 1, wherein the photoresist layer is formed on the transparent substrate by spin coating.

8. The method according to claim 1, wherein the transparent conductive layer is an ITO film.

9. A micro-fluidic manufacturing method of forming a color filter, comprising steps of:

a providing a transparent substrate with a plurality of black matrixes;

forming a plurality of high-wall ribs and connecting ribs for connecting the high-wall ribs on the black matrixes respectively, wherein the width of the high-wall rib is not larger than the width of the black matrix, the width of the connecting rib is not larger than the width of the black matrix, and the height of the connecting rib is less than the height of the high-wall rib;

injecting a plurality of micro fluids of a predetermined color into a plurality of predetermined areas separated by the high-wall ribs and connecting ribs, wherein the micro fluids within each predetermined area are mixed to serve as an ink;

drying each ink within each predetermined area to form a plurality of color layers of different colors;

removing the high-wall ribs and connecting ribs; and forming a transparent conductive layer on the transparent substrate to cover the black matrixes and the color layers.

10. The method according to claim 9, wherein the step of forming the high-wall ribs and connecting ribs comprises steps of:

forming a photoresist layer on the transparent substrate to cover the black matrixes; and using lithography to pattern the photoresist layer as the high-wall ribs and connecting ribs.

11. The method according to claim 10, wherein the photoresist layer is formed on the transparent substrate by a dry film method.

12. The method according to claim 10, wherein the photoresist layer is formed on the transparent substrate by spin coating.

13. The method according to claim 9, wherein during injection of micro fluids, a micro-fluidic jetting device is employed.

14. The method according to claim 13, wherein the micro-fluidic jetting device is a thermal bubble ink jet printing apparatus or a piezoelectric ink jet printing apparatus.

15. The method according to claim 9, wherein during drying of the ink, a heating device is employed.

16. The method according to claim 15, wherein the heating device is a luminescent device.

17. The method according to claim 9, wherein the transparent conductive layer is an ITO film.

* * * * *